United States Patent [19]
Bailey

[11] Patent Number: 5,917,160
[45] Date of Patent: Jun. 29, 1999

[54] SINGLE WELL SYSTEM FOR MAPPING SOURCES OF ACOUSTIC ENERGY

[75] Inventor: Jeffrey R. Bailey, Houston, Tex.

[73] Assignee: Exxon Production Research Company, Houston, Tex.

[21] Appl. No.: 09/028,226

[22] Filed: Feb. 23, 1998

Related U.S. Application Data

[63] Continuation-in-part of application No. 08/298,610, Aug. 31, 1994, Pat. No. 5,747,750.
[51] Int. Cl.$^6$ ....................................................... G01V 1/00
[52] U.S. Cl. ............................... 181/112; 181/222; 702/16
[58] Field of Search ..................................... 181/108, 112, 181/122; 73/152.16, 152.12; 702/14, 16, 18

[56] References Cited

U.S. PATENT DOCUMENTS

| | | |
|---|---|---|
| 4,428,422 | 1/1984 | Laurent . |
| 4,686,653 | 8/1987 | Staron et al. . |
| 4,870,580 | 9/1989 | Lang et al. ................................. 702/14 |
| 4,888,740 | 12/1989 | Brie et al. . |
| 4,891,641 | 1/1990 | Gard et al. . |
| 4,910,718 | 3/1990 | Horn . |
| 4,992,994 | 2/1991 | Rambow et al. . |
| 5,010,527 | 4/1991 | Mahrer . |
| 5,189,262 | 2/1993 | Engler et al. . |
| 5,212,354 | 5/1993 | Miller et al. . |
| 5,290,159 | 3/1994 | Miller et al. . |
| 5,594,706 | 1/1997 | Shenoy et al. . |
| 5,771,170 | 6/1998 | Withers et al. . |

FOREIGN PATENT DOCUMENTS 2230091  10/1990  United Kingdom .

OTHER PUBLICATIONS

Dobecki, T.L., "Hydraulic Fracture Orientation Using Passive Borehole Seismics," Society of Petroleum Engineers, No. 12110, 1983.

Ilderton, David C. et al., "Microseismic Imaging of Hydrofractures with the Aid of Conical Waves," 63rd SEG Meeting, pp. 267–670, 1993.

Lacy, L. L., "Comparison of Hydraulic–Fracture Orientation Techniques," Society of Petroleum Engineers, pp. 322–332, 1984.

Sleefe, G. E., et al., "Observations of Broad–Band Micro–Seisms During Reservoir Stimulation," 63rd SEG Meeting, Washington, 1993.

Sleefe, G. E., et al., "Experimental Study of an Advanced Three–Component Borehole Seismic Receiver," 1991, 61st SEG Meeting, Houston, Texas, 1991.

Stewart, L., et al., "Acoustic–Emission Monitoring During Hydraulic Fracturing," Society of Petroleum Engineers Formation Evatuation, pp. 139–144, 1992.

Schlumberger Oilfield Review, pp. 10–14, Jan. 1994.

DIALINDEX search Jan. 20, 1994.

Derwent World Patents Index Jan. 21, 1994.

DIALOG search Jan. 24, 1994.

DIALOG search May 5, 1994.

DIALOG search May 5, 1994.

DERWENT search May 5, 1994.

DERWENT search May 6, 1994.

*Primary Examiner*—Khanh Dang
*Attorney, Agent, or Firm*—Keith A. Bell

[57] ABSTRACT

Apparatus and method for determining the location of the source of seismic energy around a well are provided. Multiple seismic receivers, each receiver having orthogonal seismic sensors, are axially spaced on a tool which is capable of sending real-time seismic signals to the surface. A method for calculating the location with respect to the receivers is also provided.

8 Claims, 10 Drawing Sheets

SINGLE WELL SYSTEM FOR MAPPING SOURCES OF ACOUSTIC ENERGY

REFERENCE TO RELATED APPLICATION

This application is a continuation-in-part of prior copending application Ser. No. 08/298,610, filed Aug. 31, 1994.

FIELD OF THE INVENTION

This invention relates to geophysical apparatus and methods. More particularly, a system is provided for locating the sources of microseismic events or other acoustic waves around a well.

BACKGROUND OF THE INVENTION

Low-energy acoustic waves are created in solids when stresses in the solid cause sudden movement of fractures or zones of weakness. The energy release may be referred to as "acoustic emission" or, more commonly when the solid is a formation in the earth, the energy release is called a "microseismic event." Microseismic events may be caused by fluid pressure changes in the pore spaces of rock, which cause stress changes in the rock and movement at planes of weakness, or by the formation of hydraulic fractures. The seismic wave generated can be considered to be an extremely weak earthquake. It has been known for many years that such microseismic events occur in hydrocarbon reservoirs in which substantial pressure changes occur.

Hydraulic fracturing of wells is widely practiced as a method for increasing the production rate of the wells. In this method, fluid is injected at a high rate and at a pressure greater than the earth stress in the formation to be fractured. Typically, a vertical hydraulic fracture is created around a well, and the fracture may extend several hundred feet from the well. The fracture may also extend significant distances along the wellbore.

It is important to know the extent of a hydraulic fracture along a wellbore, so that it can be determined if the fracture has grown to intersect other permeable zones above or below the zone of interest. It is also desirable to know the length of the fracture away from the wellbore and the direction or azimuth angle of the fracture extending away from the well, so that the influences of the fracture on flow of fluids in the zone of interest can be predicted with greater accuracy.

It is also important to know whether a hydraulic fracture has penetrated an impermeable barrier layer during injection of a fluid into a well for disposal purposes. Such fluid may be a brine, radioactive material, or a hazardous chemical waste stream, for example. It is desirable to have a tool which can detect possible movement of the fluid and any solids it may contain out of the intended injection zone. Detection of microseismic events originating beyond an impermeable barrier which bounds the intended injection zone can indicate such movement.

Not surprisingly, a large number of microseismic events are associated with the hydraulic fracturing process. Several years ago it was found that an indication of hydraulic fracture direction or azimuth angle can be derived from microseismic events occurring soon after the hydraulic fracture is formed. Early work was reported by Dobecki in "Hydraulic Fracture Orientation Using Passive Borehole Seismics," Soc. of Pet. Engrs. Paper No. 12110, 1983. Data from microseismic events were analyzed to determine the polarization of the compressive wave (P-wave) from each event to determine azimuth direction of the event, the polarization being determined from a "hodogram." A hodogram is a plot of the output of a geophone in one direction versus the output of a geophone in another direction, such as the x-direction versus the y-direction. The distance from the event to the well was calculated by measuring the difference in arrival time of the P-wave and the shear wave (S-wave) at the well and multiplying this difference by a factor involving the respective P-wave and S-wave velocities. A histogram of the seismic events following hydraulic fracturing was also plotted in polar coordinates to indicate the azimuthal distribution of events and consequently, the direction of the hydraulic fracture.

Much more recently, examination of seismic events received in a well during hydraulic fracturing, pressure fall-off after fracturing, and flow-back of fluid was reported in "Acoustic Emission Monitoring During Hydraulic Fracturing," *SPE Formation Evaluation Journal*, pp. 139–144, June 1992. It was pointed out in this paper that when detecting microseismic events with a single set of triaxial geophones, an ambiguity of 180° exists in the vertical or z-direction. The polarity of the first motion on arrival of a wave is not known because a source above or below the receiver may produce an identical signal.

A method of locating fractures from acoustic emissions received by single geophones placed in wells at a known distance from the well being fractured was reported in "Observations of Broad Band Microseisms During Reservoir Stimulation," Society of Exploration Geophysics 63rd Conference, Washington, 1993. This method is relatively expensive in that multiple wellbores must be used and multiple tools must be run. Triangulation calculations are used to locate the source of seismic events using the signals received in the separate wells.

Microseismic events may be produced in the subsurface by processes other than hydraulic fracturing of wells or pressure changes in a reservoir. Subsidence accompanying reservoir pressure reduction may also lead to movement of piles or other equipment at the surface or seabed above a reservoir, for example, producing additional microseismic events. Also, increase of pressure inside the casing of a well may cause mechanical failure of the cement sheath around the casing, and an acoustic wave may originate from very near the casing. If there is communication of fluid pressure along the wellbore outside the casing because of lack of a hydraulic seal by the cement, the pressure changes may cause microseismic events originating very near the casing.

Sources of acoustic waves in the subsurface are not limited to microseismic events. For example, a well flowing uncontrolled to the surface of the earth, called a "blowout," may flow at such high rates that significant acoustic noise is created at the bottom or at other segments of the well. There is often a need to locate the source of this noise in order to assist in attempts to stop the uncontrolled flow. Measurements of the source of the noise may be made from offset wells.

Wellbore acoustic receivers for detecting seismic waves have become widely available in recent years for Vertical Seismic Profiling (VSP) in wells. Typically, these wellbore acoustic receivers have three orthogonal seismic transducers (geophones or accelerometers) and include means for clamping the receivers against the casing of a well. In recent years, acoustic receivers suitable for seismic waves up to frequencies of 1000 Hz have been developed for cross-well seismic imaging. Such receivers, described in U.S. Pat. No. 5,212,354, may be used simultaneously at several levels, at intervals of about 10 feet between each receiver, to record seismic signals generated in another well. These seismic receivers use hydraulic pressure to clamp the receivers against casing with a high force compared with the weight of the receiver. A plurality of receivers may be used in a well, flexibly connected by hydraulic hose to other receivers and to the source of hydraulic pressure. The seismic signals are typically digitized and transmitted to the surface of the earth over conventional electrical wireline. Digitization of the downhole signals commences upon trigger activation of the "shot break" and continues for one or more seconds as data is stored in downhole memory. Subsequently, the data is pulsed to surface over a digital channel while the tool is inactive.

There is a need for improved apparatus and method to be used in a well to detect microseismic signals or other acoustic waves arriving at that well in real-time, with no periods of inactivity. The apparatus and method should decrease the ambiguity present in prior measurements; specifically, the 180° ambiguity present when only one set of triaxial transducers is used in a well. To make possible real-time acquisition of data from multiple receiver units having triaxial transducers, improved apparatus and method for communicating additional channels of data to the surface are needed. Also, to assist in interpreting real-time microseismic activity around a well, means for communicating to the surface other downhole data, such as pressure, temperature, and hydrophone signals in the wellbore, should be available. Therefore, there is a need for means of telemetry of at least 6 and preferably 9 or more channels of data to the surface as acoustic waves around a well are generated and received. There is also a need for an improved method to process and allow interpretation of the data from the multiple receivers to provide greater accuracy in locating the sources of the acoustic waves. In addition, there is a need to determine whether a microseismic event originated above or below a specific location in a well. This information can be used, for example, to determine if a hydraulic fracture has formed from injection of fluid into a well and the fracture has penetrated an impermeable barrier confining the injection zone.

SUMMARY OF THE INVENTION

In one embodiment, the apparatus comprises a plurality of seismic receivers incorporated into a single tool. The receivers on the tool are axially spaced apart a distance so as to facilitate location of microseismic event sources in a vertical plane and are clamped in a well. The receivers are connected to the tool in a manner that permits axial bending, but prevents torsional deformation. Torsional deformation must be prevented because it is important to know the azimuthal orientation of each receiver with respect to each other receiver. Signals from the receivers are transmitted to the surface over wireline in real-time using frequency modulated telemetry signals. The multiple individual signals are recovered at the surface by bandpass filtering and converted to amplitude modulated signals. Alternatively, signals from the receivers may be digitized downhole and transmitted to the surface in real-time over a fiber optic cable or a copper wire.

In one embodiment, a downhole electronic circuit to compress the data using a dynamic range compression algorithm is included. In another embodiment, the electronic module may contain a gyroscopic method or inclinometer method for orientation measurements, pressure and temperature sensors, casing collar locator, and one or more hydrophones, along with the power supply and associated circuitry.

A method for locating acoustic wave sources employing data from multiple receivers is provided. The method is based on the characteristics of the compressive waves (P-waves) and shear waves (S-waves) that are generated by microseismic events, namely:

Particle motion of the P-wave is along the travel path from the event location or source to the receiver.

Particle motion of the S-wave is perpendicular to the travel path.

The P-wave is generally faster than the S-wave and therefore will arrive first.

Estimated traveltimes from source to receiver may be calculated by several methods known by those skilled in the art.

The source location may be defined in cylindrical coordinates by azimuth angle, depth below the surface of the earth, and perpendicular distance between source location and wellbore axis. This location may then be transformed to the more conventional earth coordinate systems of northerly and easterly components and depth by using well-known trigonometric relationships.

The azimuth angle to the source defines a vertical plane through the wellbore axis that contains the source location. The azimuth angle is determined by a best fit solution to the microseismic data using hodogram analysis methods for both the P-waves and S-waves. This analysis is conducted on windowed intervals of data that have been inverse time shifted to align the arrivals in a common window frame. The respective time shifts are determined from the calculated P-wave and S-wave traveltimes from a possible source location to each receiver.

The source location in this plane is found by examining the time differences between arrivals of P-waves and S-waves at two or more (preferably at least three) receivers. The most likely source location in the plane is that for which the time differences of the P-wave and S-wave arrivals at each receiver are most closely approximated by the estimated traveltime differences based on the source location, formation velocity characteristics, and the traveltime estimation methods. For a tool consisting of three receivers, there are 15 different arrival time differences to consider, i.e. three each for $P_i-P_j$, $S_i-S_j$, $P_i-S_j$, $P_2-S_j$, and $P_3-S_j$. The position in the x-z plane aligned with the azimuth that provides the highest degree of alignment of these arrival times is the most likely source location.

In yet another embodiment, apparatus of this invention is placed in a well and signals from two receivers are observed to determine if a hydraulic fracture has penetrated a selected depth in a formation around the well.

DETAILED DESCRIPTION OF THE DRAWINGS

DETAILED DESCRIPTION OF THE INVENTION

Figure 1:
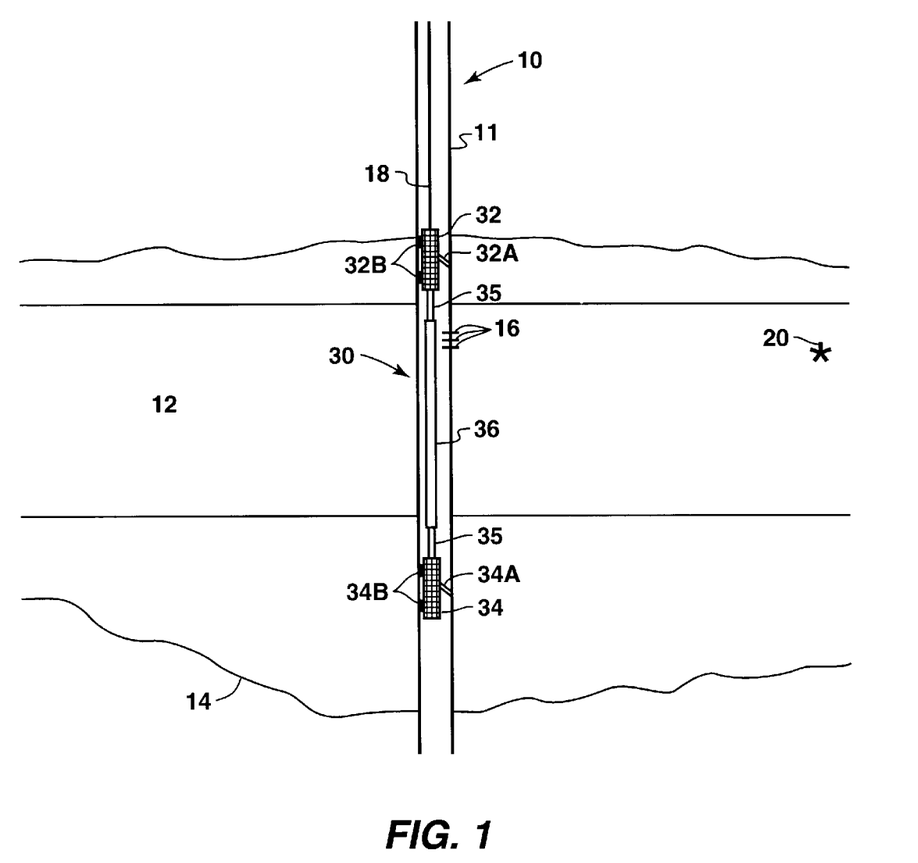
FIG. 1 illustrates a well having a hydraulic fracture extending therefrom and a first embodiment of apparatus of this invention suspended therein.

Referring to FIG. 1, well 10, penetrating formation 12, contains casing 11 and has been hydraulically fractured to form vertical fracture 14 in and extending from formation 12. Microseismic event 20 has occurred along the plane of hydraulic fracture 14.

Apparatus 30 of this invention has been placed at some point in casing 11 having perforations 16 using wireline 18, which may be a conventional seven-conductor electric wireline or, as further described below, a fiber optic cable or copper wire for digital data transmission. Wellbore 10 may be in any selected direction, although the description provided herein will refer to a vertical wellbore. Apparatus 30 comprises receiver units 32 and 34 and electronic module 36. Electronic module 36 may also contain a pressure and a temperature sensor, a hydrophone, a gyroscopic directional indicator or inclinometer, and other types of instruments. Receiver units 32 and 34 are clamped to casing 11 by clamps 32A and 34A, respectively, with sufficient force to insure that they follow the movement of the casing at least up to the highest frequencies of the seismic energy to be detected. Standoff feet 32B and 34B may be used to increase effectiveness of the clamping force.

Receivers 32 and 34 preferably contain triaxial geophones or accelerometers, e.g., three orthogonal geophones or accelerometers, although for some applications it will not be necessary that sensors be used for all three directions. Preferably, the clamping force exerted by clamps 32A or 34A is at least equal to one-half the total weight of the tool, but may be several times as great. Clamps 32A and 34A may be actuated by any source of force, but preferably are actuated by an electric motor, which may be controlled from the surface using well-known techniques. Additional receivers, similar to 32 and 34, may be added to the apparatus, each receiver spaced apart from the other receivers.

The distance between receiver units 32 and 34 is selected to be sufficient to allow a measurable difference in the time of arrival of acoustic waves from microseismic events which originate at significant distances from the well. The receivers are preferably at least 10 feet apart, which would be adequate to measure differences in arrival times of P-waves originating from a microseismic event occurring remote from the well and significantly above or below the plane perpendicular to the tool, but more preferably the receivers are at least 30 feet apart. The receivers are preferably placed at opposite ends of the tool. Sinker bars to increase the weight of the tool for running into wells under pressure may be added to the tool. The presence of two triaxial receivers on the tool makes possible determination of whether a microseismic event has occurred above or below the tool, and will thus resolve the 180° ambiguity present in the prior art tools, since the acoustic energy from the event will arrive first at the receiver nearest the event.

The maximum distance between receivers or the length of the tool will usually be limited by the length of the lubricator available if the apparatus is used in a well which will have pressure at the surface when the tool is run in or removed from the well. A lubricator is a device attached to the wellhead of a well for sealing around the wireline used to support a tool in a well. The maximum length of a standard lubricator is about 90 feet.

Couplings 35 between receivers 32 and 34 and electronic module 36 are preferably flexible to allow axial bending while the receivers are in the clamped position but are sufficiently rigid to prevent significant torsional deformation. It is important that the angle between the receivers along the axis of the tool be constant while the tool is in a well, such that the azimuth angle of each receiver be determinable with respect to the other receiver and to a means of orienting the tool in a well, such as a gyroscope. To minimize transmission of acoustic energy between receivers, couplings 35 are preferably smaller in diameter than electronic module 36 or receivers 32 and 34. To minimize weight and provide suitable mechanical properties of couplings 35, couplings 35 are preferably tubes, which are preferably made of titanium, but may be made of any metal having suitable physical properties. A cable or hose comprised of strands interwoven so as to have high resistance to torsional deformation may also be used. The stiffness of coupling tubes 35 is preferably selected to allow bending of tool 30 in curved wellbores when the clamping force is applied by arms 32A and 32B. The bending allows receivers 32 and 34 to align with the wall of casing 11 and thereby to contact casing 11 over a greater area, which has the benefit of increasing signal strength from a source of acoustic energy outside the casing. The curvature of wells in intervals where the tool is to be run may be measured by techniques well-known in the art. This curvature, along with mechanical properties of the coupling tubes, is preferably used to calculate bending of couplings 35 when the clamping force is applied, to insure that receivers are aligned with the wall of the casing in a well by the clamping force.

As an example of the dimensions of the various components of a tool for use in wellbores, receivers 32 and 34 may be 2.6 inches in diameter, electronic module housing 36 may be 2.25 inches in diameter, and couplings 35 may be 1.6 inches in diameter. In addition to the components shown in FIG. 1, the tool may have a "bumper sub" attached at the bottom to minimize shocks to the tool when running in a well.

Figure 2:
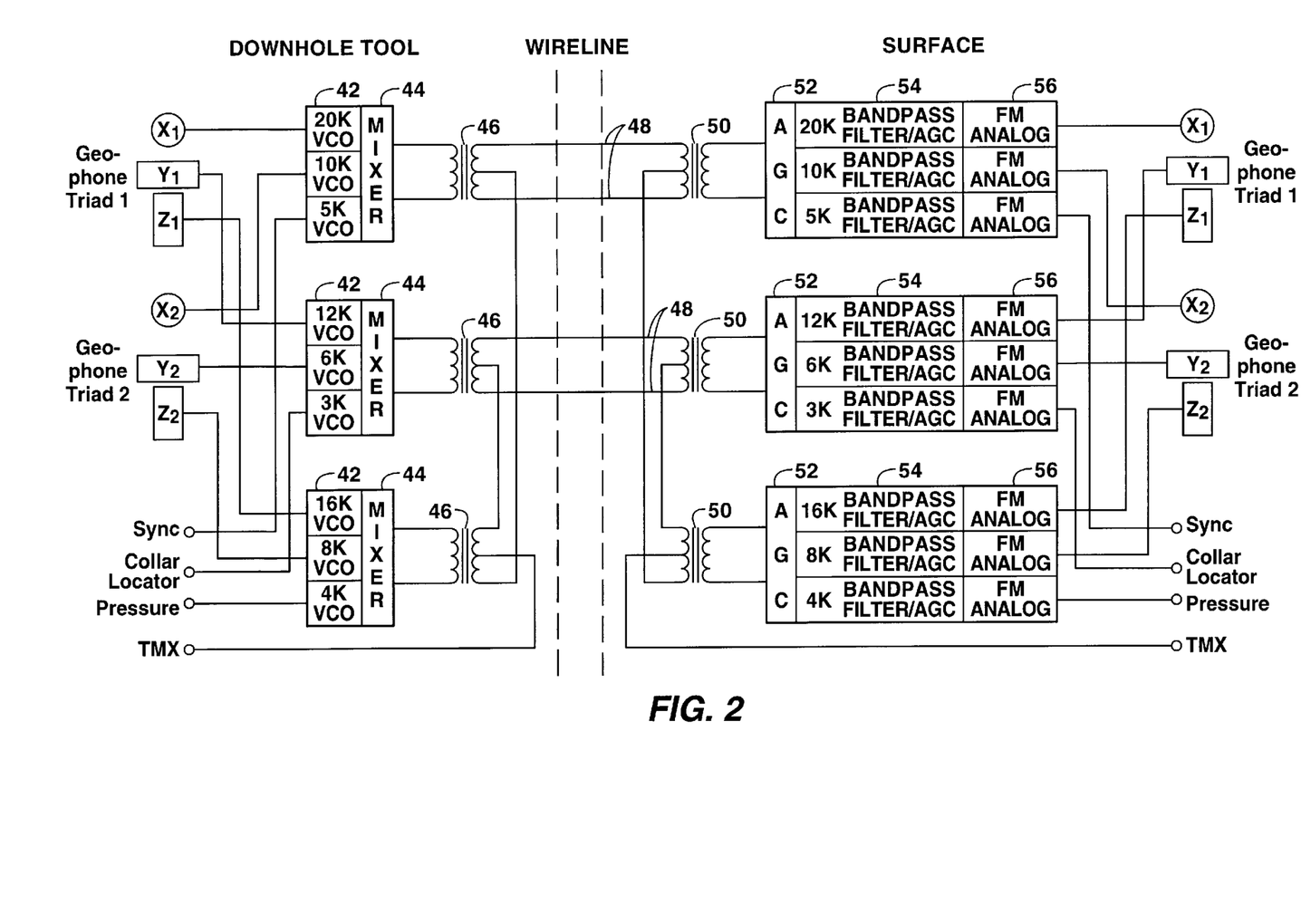
FIG. 2 is a schematic of electronic components used in one embodiment of the apparatus of this invention.

Electronic module housing 36 includes the components of the "Downhole" segment of the circuit schematically illustrated in FIG. 2. Inputs to the circuit are the signals from the six sensors in the x, y and z directions in receiver units 32 and 34 and DC voltage signals from auxiliary instruments such as a pressure sensor, a temperature sensor, a collar locator, or a time synchronization pulse. Each of these signals is fed to a voltage controlled oscillator (VCO) 42 having a selected central frequency. These frequencies may be in the range from about 3 kHz to about 20 kHz. A proportional band oscillator or IRIG oscillator may be used in place of the VCO. The central frequency of each VCO receiving a signal from a sensor is selected to differ from the central frequency of other VCOs by a sufficient amount to allow for a bandwidth of frequencies adequate to transmit the sensor signals. Experiments observing microseismic events during hydraulic fracturing showed that the events could be adequately analyzed with frequencies below about 1000 Hz. A bandwidth of about 5 per cent on each side of the center frequency was selected around the central frequency of each VCO receiving a sensor signal. The carrier frequencies are logarithmically equally spaced for optimal filtering and channel separation at the surface. It was found that the amount of "crosstalk" between signals being transmitted over wireline greatly increased at higher frequencies, and there was appreciable attenuation at frequencies above 20 kHz, Therefore, it was concluded that the highest carrier frequency should be in the range of about 20 kHz and that precise filtering of signals at the surface would be required to separate each individual channel. The carrier frequencies and FM 10 deviations are configured such that the intersection of a pass band with its nearest neighbor occurs at an amplitude at least 40 dB down from the amplitude at the peak frequency. Frequencies indicated for each VCO on FIG. 2 were found to be a good compromise between minimizing crosstalk and attenuation of nine channels of signals transmitted over a 21,000 foot length of seven-conductor wireline while maintaining adequate signal resolution. Note that frequency separation at the lower frequencies can be reduced to only 1 kHz for use in transmitting auxiliary (not seismic) signals having lower bandwidth.

The VCO signal may consist of a slope-modulated triangle wave or of a sinusoidal or other suitable repetitive signal. In the downhole circuit shown in FIG. 2, signals from three VCOs are fed to a mixer circuit 44 for each group of central frequencies. In the mixer circuit, signals are passed through a low-pass filter to round the waveform and attenuate odd harmonics, each channel is gained by a calibrated value to boost high frequencies, and the signals are added. Output from each mixer is fed to the primary coil of transformers 46. It was found that to avoid severe attenuation at the higher frequencies it was necessary that transformer 46 be low impedance. This transformer was specifically built for data telemetry. It preferably has a ferrite core and is designed for operation at up to 100 kHz at a temperature of up to 200° C. A time-multiplexed signal is fed to the center tap of the secondary coil of transformer 46 receiving the intermediate frequency band, and the secondary of this transformer is fed to center taps of the other two transformers such that the outputs of all three transformers are fed to four conductors 48 of a wireline to transmit the signals to surface.

In an alternative embodiment of the electronics, the VCO outputs as shown in FIG. 2 are fed to a single mixer circuit, and the output of the mixer is fed to the primary coil of a single transformer. In this embodiment, the secondary of the transformer feeds only two conductors of a wireline. Other conductors in the wireline, if any, are then available for other signals.

Electronic module 36 may also include a dynamic range compression circuit for each geophone signal. This will make possible capturing more microseismic events which are larger and smaller than those otherwise captured. A square root analog signal may be produced to compress an input voltage range of −25 V to +25 V to the range of −5 V to +5 V, for example.

Wireline 18 of FIG. 1 exits well 10 and connects at the surface to a "surface" electronic unit (not shown). The electronic components of the surface electronic unit are shown in FIG. 2. The mixed frequency signals from wireline conductors 48 feed transformers 50, and the intermediate frequency transformer is center tapped by a time-multiplexed signal. The secondary of each transformer feeds Automatic Gain Control (AGC) circuit 52 for each group of frequencies. The signals are then filtered by bandpass filter/AGC 54. The filter is very important to the success of the FM telemetry system. Preferably, a system of filters is used to produce a reduction in signal strength of at least 40 db at the intersection of neighboring bandwidths. Digital bandpass filters, such as the SGS Thomson TGS 8550 or 8551, are suitable for this purpose. Alternatively, analog filters may be used. The output of the filter then feeds circuit 56, which includes a frequency-to-voltage converter, consisting of a high-speed comparator sampling circuit to determine the period of each wave. The time interval digital count is converted to an analog signal via a digital-to-analog converter. The analog signals from each acoustic sensor and other instruments may then be displayed and recorded.

In an alternate embodiment of the invention, wireline 18 (Fig. 1) comprises a cable having one or more fiber optic strands to enable real-time, multiplexed digital data transmission from the downhole acoustic sensors to the surface electronics and one or more conventional metal strands for transmission of power to the tool, activation of clamp arm motors, monitoring of the collar locator sensor, and use of a gyroscope instrument. In this embodiment, the electronic module 36 would include a downhole digitizing circuit (not illustrated) to convert the analog output signals from the multiple acoustic sensors to digital form. The gains of this digitizing circuit may be fixed or possibly varied under control from a signal from the surface. The digitized signals would then be multiplexed and fed to a transceiver (not illustrated) to convert the digital electronic signal to light pulses for transmission to the surface over the fiber optic strands. In this embodiment of the invention, data from microseismic events are transmitted to the surface in real-time, without the necessity for downhole data storage. Thus, the tool is able to monitor for the occurrence of microseismic events on a continuous basis, with no periods of inactivity and no duty cycle.

At the surface, a corresponding transceiver (not illustrated) would receive the light pulses, convert then to digital form, and demultiplex the signal. The digitized output from the downhole sensors would then be directly available from the surface unit for storage on a digital computing system without further conversion. If desired, the digital signals could be converted back to analog form and then recorded on tape for a continuous analog history and data archiving.

The downhole data digitizing and transmission system described above would be a complete replacement for the frequency modulated data telemetry system shown in FIG. 2. Data from other conventional downhole sensors (such as a collar locator, a temperature sensor, a pressure sensor, and/or a time synchronization pulse) may be transmitted to the surface in digitized form over the fiber optic strands or, alternatively, in analog form over the conventional metal strands.

It has been shown that a copper wire may also be used for real-time transmission of digital data in the form of electrical pulses. Therefore, in another embodiment, copper wires are used instead of the fiber optic strands for digital data transmission. In this embodiment, high speed modem technology is used to transmit the digitized and multiplexed data to a compatible transceiver unit on the surface.

Figure 3:
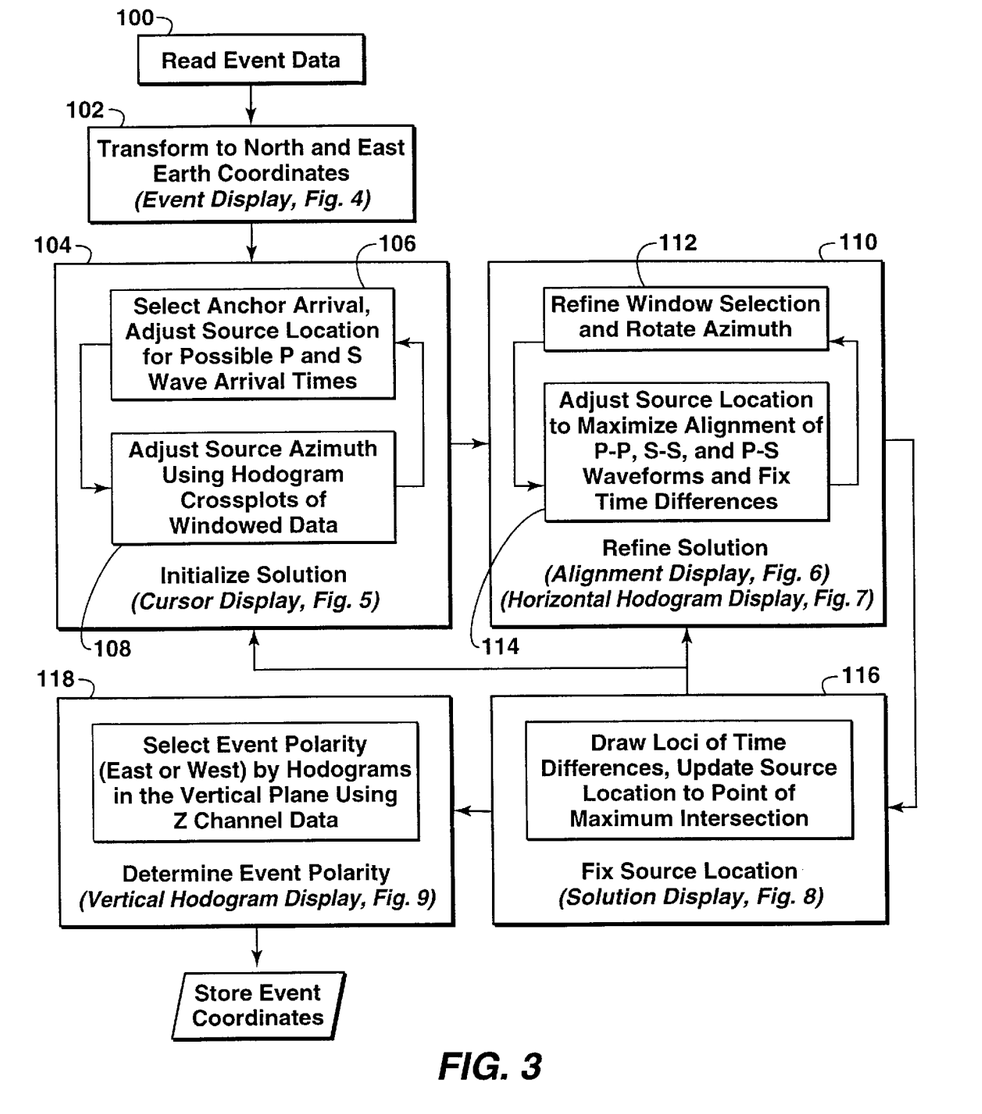
FIG. 3 is a flowchart illustrating the principle steps of one embodiment of a method for estimating the source of a microseismic event according to this invention.
Figure 10:
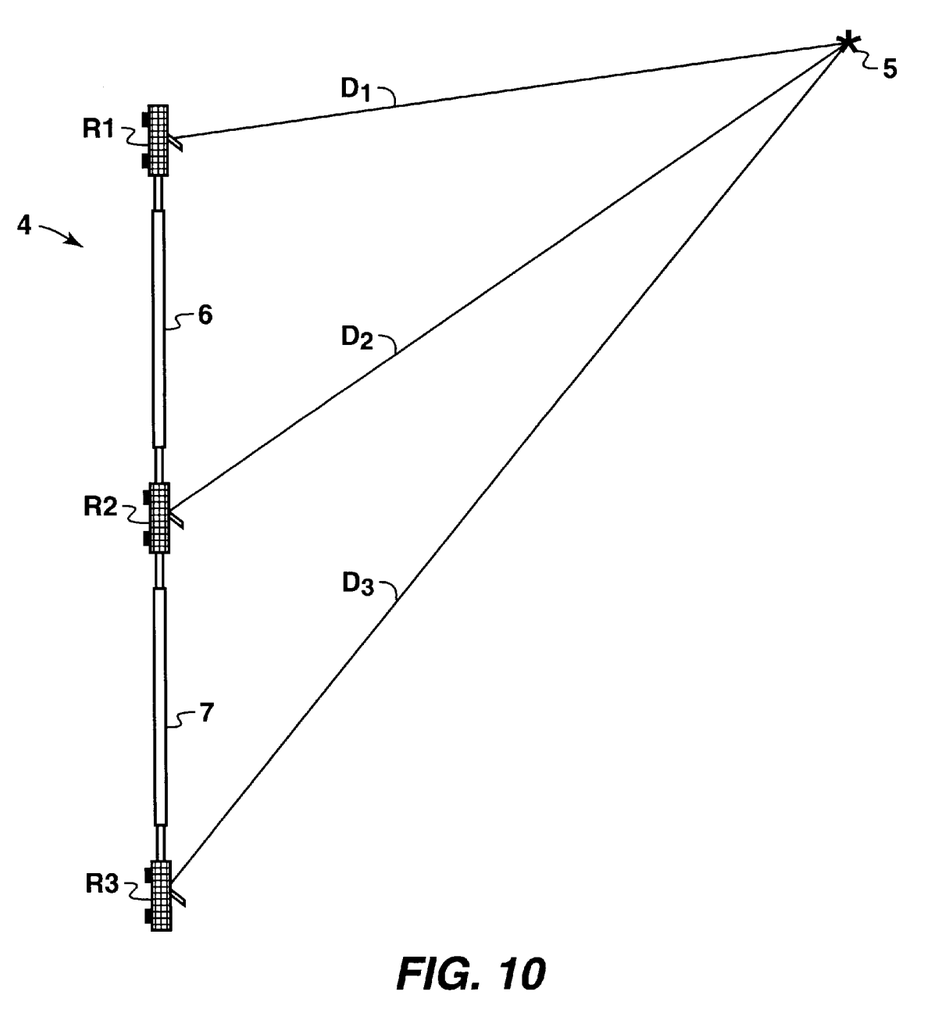
FIG. 10 illustrates a second embodiment of the invention used in implementing the method of FIGS. 3–9.

FIG. 3 is a flowchart illustrating the principal steps of a preferred embodiment of the method for estimating the source of a microseismic event, and FIG. 10 illustrates the apparatus used in implementing the preferred method. Turning first to FIG. 10, the apparatus 4 has three spaced-apart acoustic receivers R1, R2, and R3 of x-axis and y-axis data (rather than two receivers as described above). In addition, one or more z-axis channels may be used to resolve event polarity. The preferred method may be implemented using either a frequency modulated data telemetry system, as described above in connection with FIG. 2, or a multiplexed digital data transmission system using fiber optic strands or copper wires, as described above. Accordingly, the electronics modules 6 and 7 in FIG. 10 may contain the appropriate equipment for either type of data transmission.

The method is based on the following physical properties of microseismic signals:
  The recorded signals consist of an initial compressional wave (P-wave) arrival, followed some time later by a shear wave (S-wave) arrival.
  The P-wave direction is aligned with a vector at the receiver pointing at the source of the microseismic event, and the S-wave is orthogonal to the P-wave vector. Thus, for sources away from the wellbore, a hodogram or x-y crossplot of a time windowed portion of the P-wave generates an ellipse whose major axis is aligned with the azimuth to the source, and the hodogram of the S-wave forms an ellipse whose major axis is perpendicular to the line from the receiver to the source location.

The P-wave propagation speed (or "slowness") is $\sigma_P$, and the S-wave slowness is $\sigma_s$ (expressed in units of traveltime per unit length). The P-wave propagates faster, so $\sigma_P$ is less than $\sigma_s$. For P-wave and S-wave traveltimes of $t_{P1}$ and $t_{s1}$, respectively, and distance $D_1$ from the source location 5 to receiver R1, the traveltimes may be calculated from $t_{P1}=D_1\sigma_P$ and $t_s=D_1\sigma_s$. Similar relationships hold for traveltimes $t_{P2}$ and $t_{S2}$ (and distance $D_2$) for receiver R2 and for traveltimes $t_{P3}$ and $t_{S3}$ (and distance $D_3$) for receiver R3. Various methods known in the art may be used to calculate the effective average slowness of P-waves and S-waves in layered earth media of variable properties.

Persons skilled in the art will understand that the method is preferably practiced using a suitably programmed digital computer. Such persons could easily develop computer software for performing the method based on the teachings set forth herein.

The following description will illustrate implementation of the inventive method using an interactive, graphical computer software code that has been designed to be interpretive and flexible in its use. The code consists of six basic displays that are used interactively to examine the event data, initialize a solution, and then refine that estimate to determine the most likely source location. However, other implementations of the inventive method are possible. Accordingly, the following description is intended to be illustrative of the method only and is not to be considered as limiting the scope of the invention.

Figure 6:
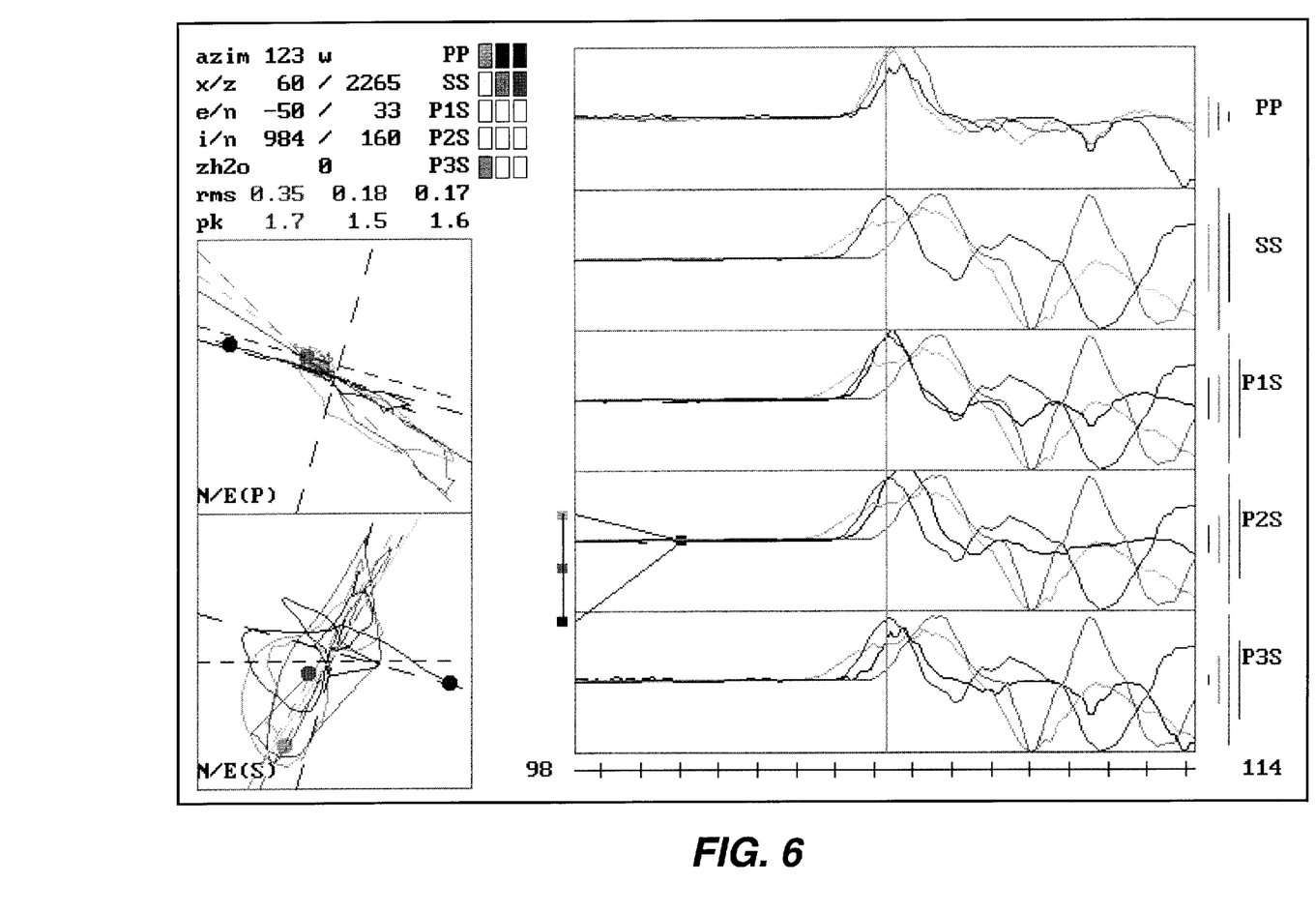
Figure 7:
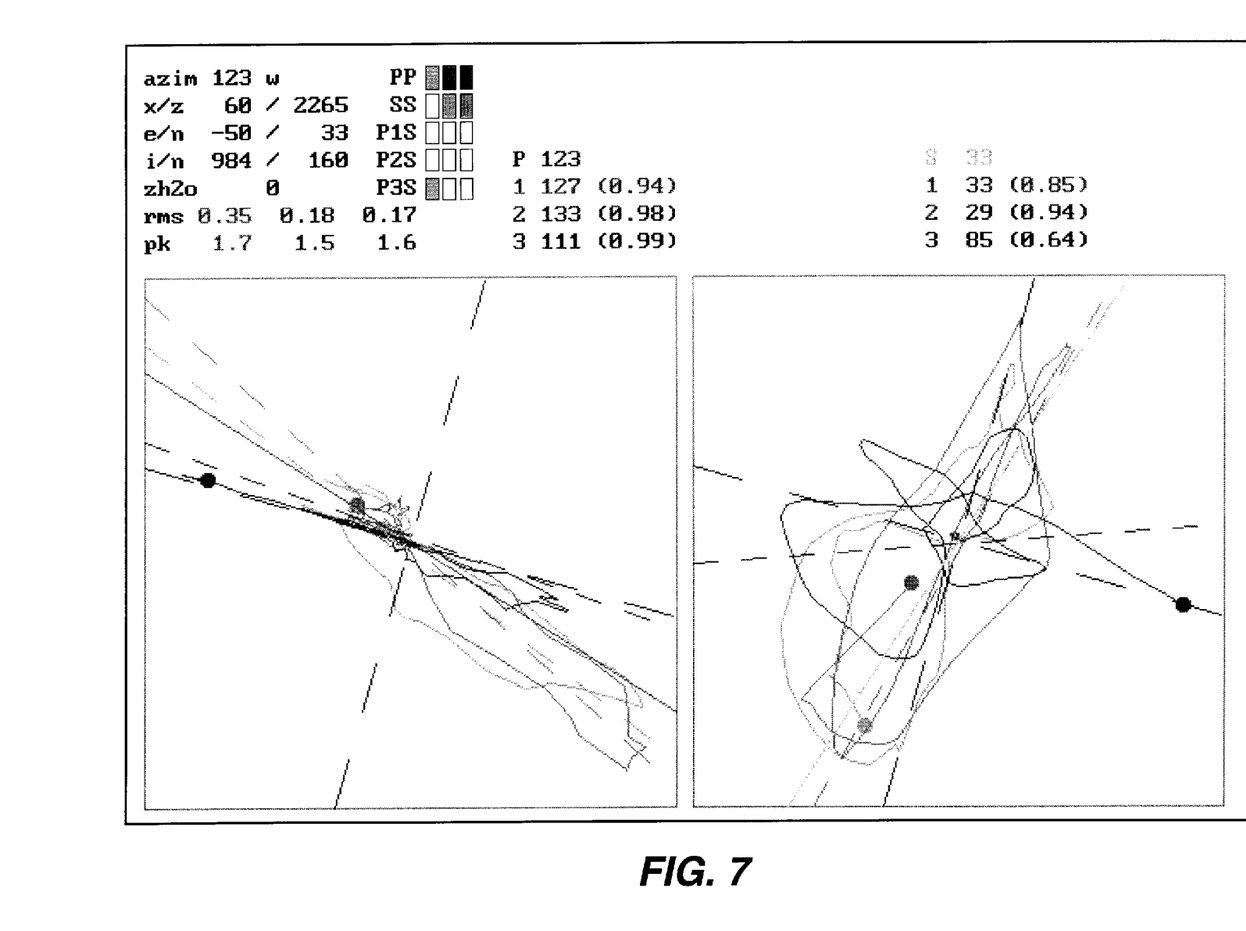
Figure 8:
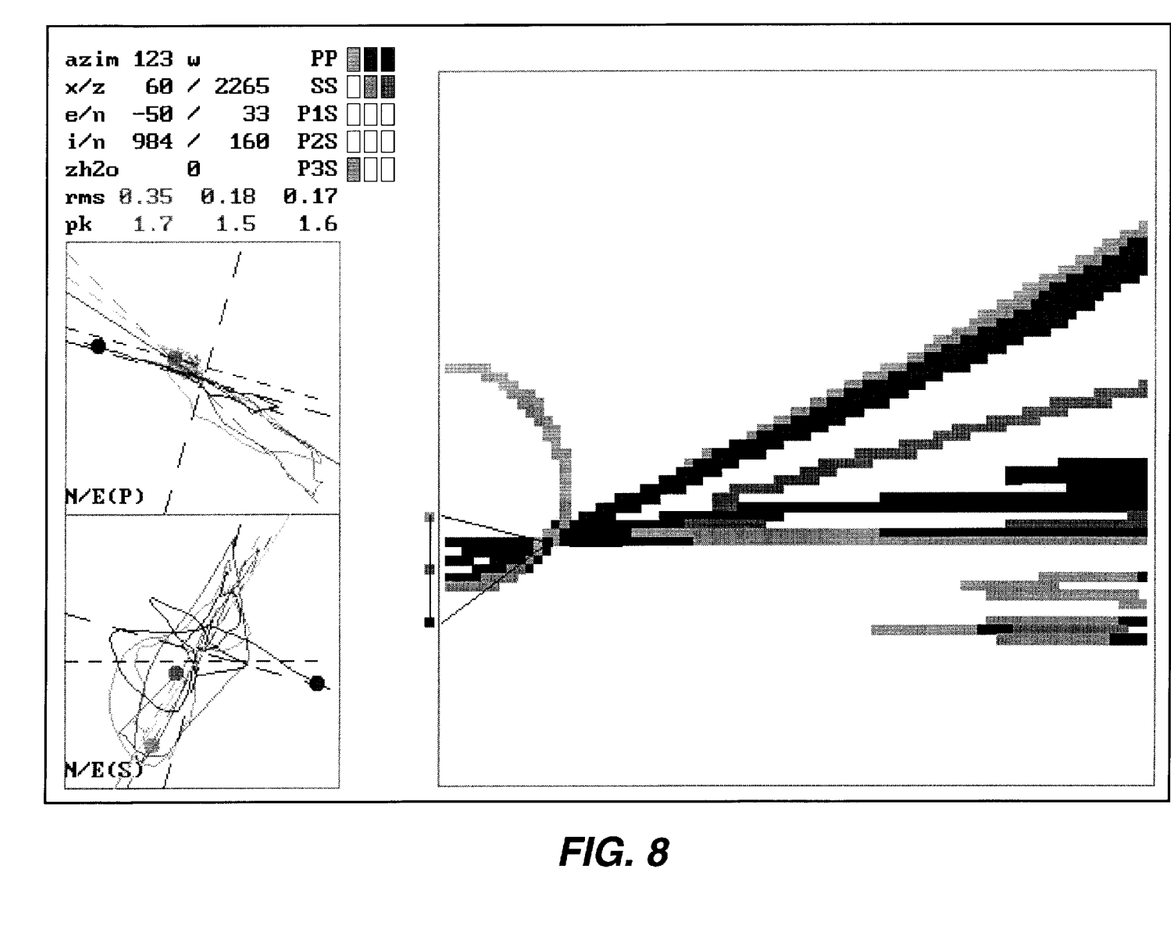

The six basic displays of the interactive software code are illustrated in FIGS. 4–9. It will be understood that in actual practice these six displays utilize a number of different colors to aid the user in identifying and interpreting the data. The six basic displays have certain features in common. For example, there is a common set of text in the upper left corner of each display. In this text, "azim 121 w" means that the azimuth to the current estimated source location is N 121° E, and the event is on the west side of the well (azimuth is calculated from 0° to 179° corresponding to standard compass directions, and east "e" and west "w" are used to indicate the side of the wellbore where the event occurred); "x/z 60/2265" means that the current estimated source location is at a depth of 2265 feet and at a range of 60 feet from the wellbore; "e/n –51/31" means that the current estimated source location is 51 feet to the west (negative easterly value) and 31 feet to the north of the wellbore; "i/n 1008/160" means that the current setting for the windowed displays is to start the window at an index of 1008 and display 160 time samples of each data series; "zh2o 0" is a measure of the distance along the wellbore from receiver R1 to a hypothetical source location used to investigate the possibility of energy propagation along the wellbore at the acoustic velocity of water or steel; "rms 0.36 0.18 1.17" means that the root-mean-square value of the data (a measure of standard deviation) is 0.36 for receiver R1, 0.18 for receiver R2, and 0.17 for receiver R3; "pk 1.7 1.5 1.6" means that the peak magnitude of the data is 1.7 for receiver R1, 1.5 for receiver R2, and 1.6 for receiver R3. The "PP", "SS", "P1S", "P2S", and "P3S" notations, each followed by three rectangles, are used to indicate that the time difference fixes (discussed below) have been set if the respective rectangle is filled with the color of the corresponding loci of points in the "Solution Display" (FIG. 8).

Turning now to FIG. 3, the x and y data corresponding to a microseismic event from each of the three receivers are read into computer memory from storage (step 100) and then are transformed to north and east earth coordinates 102. This transformation is accomplished by coordinate rotation through an angle determined by the tool clamping arm azimuth and geophone orientation using well-known trigonometric relationships. While not absolutely necessary for the method, transformation of the data to north and east earth coordinates permits the source location to be determined with respect to known surface directions.

Figure 4:
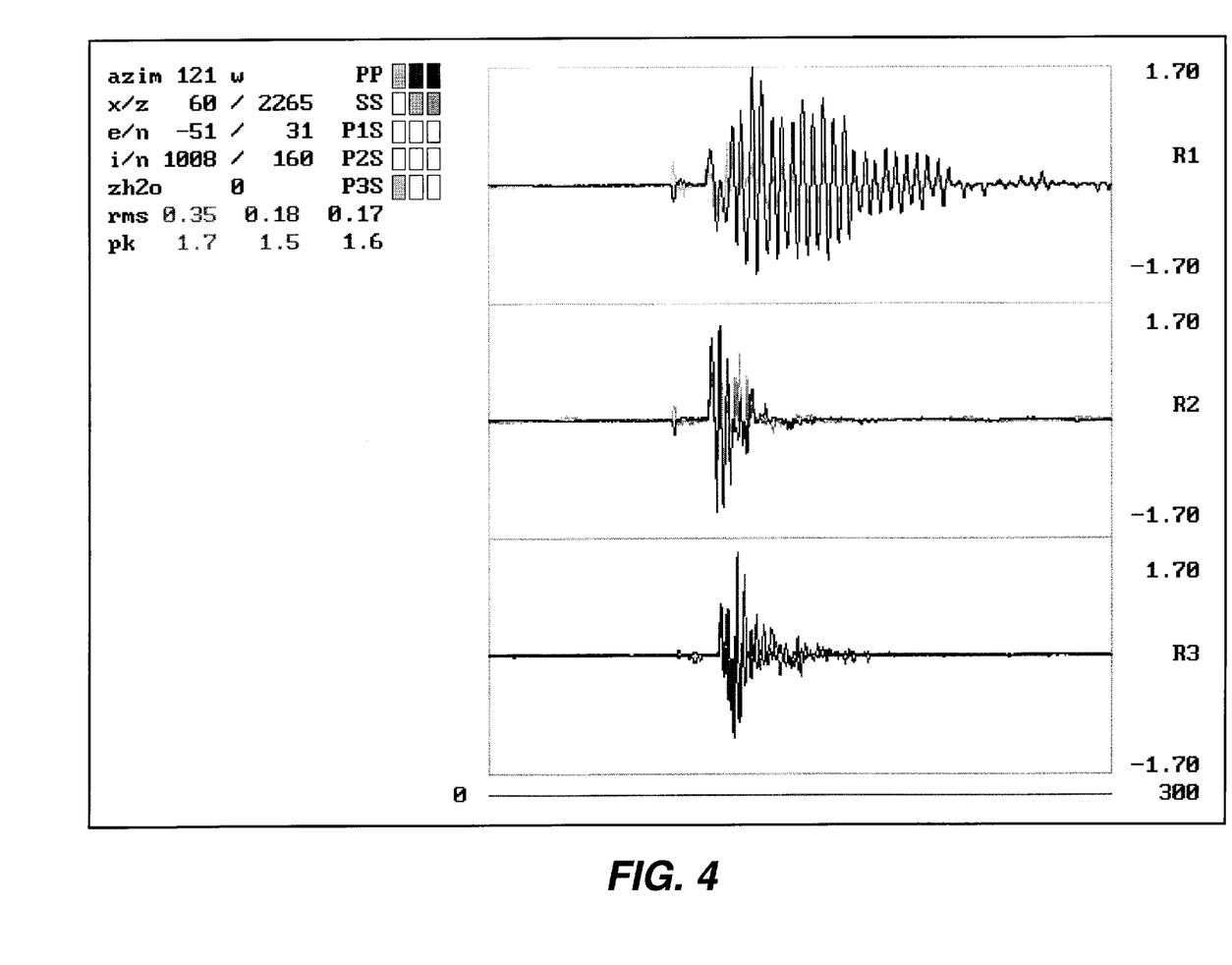
FIGS. 4–9 illustrate six computer-generated displays used in implementing the method of FIG. 3 for estimating the source of a microseismic event.

FIG. 4 illustrates the "Event Display" which is used to view the data as the user scrolls through a file of recorded events. Time series data recorded by each of the three receivers, R1, R2, and R3, are shown transformed to northerly and easterly components. Each of the three plots consists of two traces, a P-wave trace and an S-wave trace, for the receiver in question. Note that the duration of the microseismic event shown in FIG. 4 is less than 300 milliseconds.

On entry to the Event Display, the text data in the upper left corner corresponds to an initial event location. The text data on the Event Display (and all other displays) is continuously updated as the event analysis proceeds. The initial position may be set by the program to the location of the previous event, or perhaps to some arbitrary location such as a position due east, at the depth of the top receiver, 100 feet from the well. The initial solution location is not critical to the method, but if the new event is located near a prior event then proper initialization may expedite solution of the current event.

Recorded events are examined using the Event Display to determine if the recorded signals are likely to be microseismic in origin (some recorded datasets are not) or if the event appears to be interpretable. There are events that are recorded that produce significant signals at only one receiver, and these are generally found to be uninterpretable events that are likely to have been generated near the wellbore. The user proceeds to analyze a particular event if the event appears to be interpretable.

Figure 5:
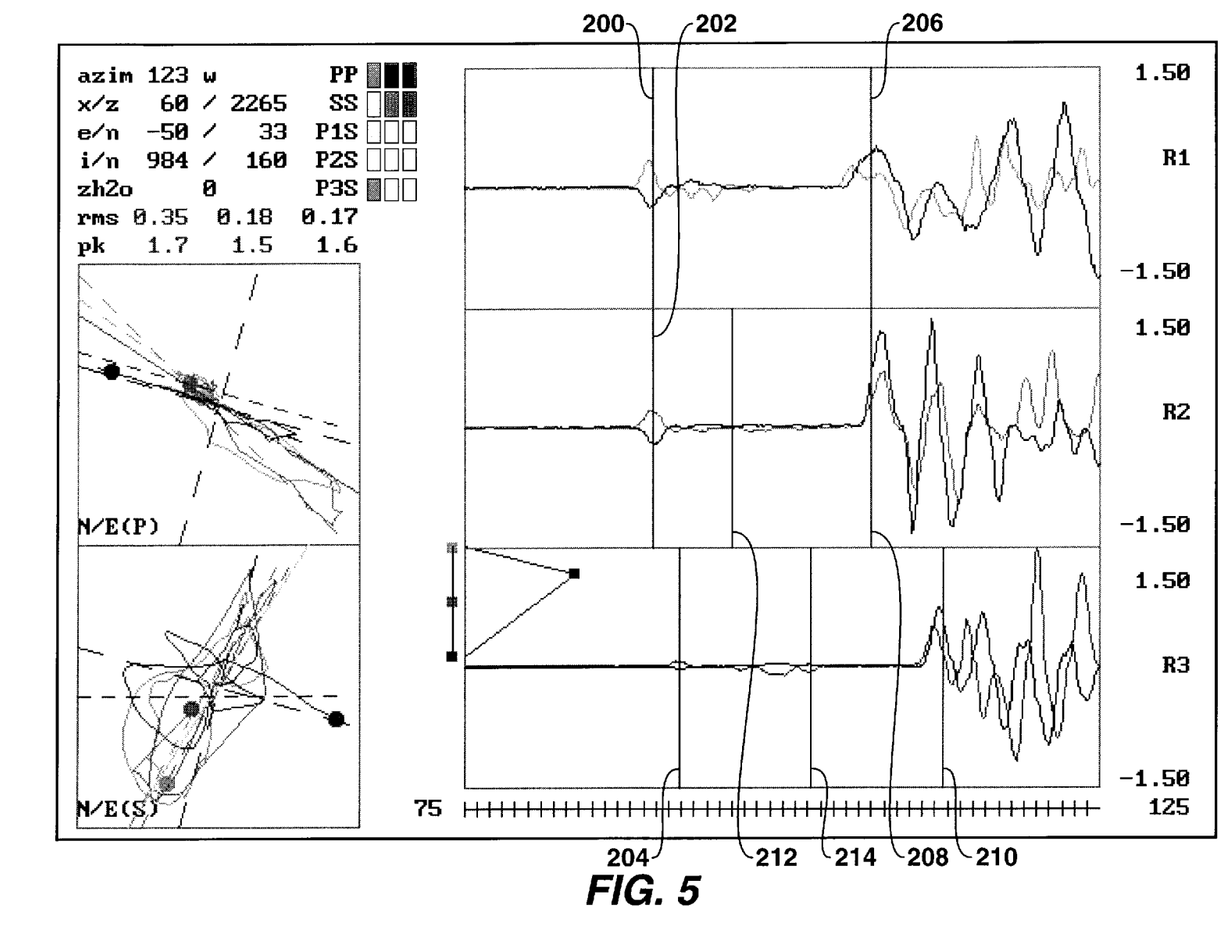

The next step of the method is to initialize the solution (reference numeral 104 in FIG. 3). The results of this step are displayed in a "Cursor Display," an example of which is shown in FIG. 5. In FIG. 5, windowed portions (e.g., from 75 to 125 milliseconds) of the horizontal component data are shown with no time shifts applied. Cursors 200, 202, and 204 are used to identify P-wave arrival times, and cursors 206, 208, and 210 are used to identify S-wave arrival times. These cursors are defined using the current source location estimate shown in the upper left corner of the display and the associated traveltimes $t_{P1}$, $t_{s1}$, $t_{P2}$, $t_{S2}$, $t_{P3}$, and $t_3$ calculated as described above. Because the traveltime differences are measured, and the instant of the event is unknown and must be estimated, there is one degree of freedom corresponding to one cursor that must be assumed or positioned manually. This cursor is known as the "anchor cursor." The solution is initialized by selecting one of the P-wave or S-wave arrivals on one of the receivers as an anchor cursor location (step 106 on FIG. 3). By default, the P-wave arrival time of the largest amplitude event is selected for the anchor, but any of the other P-wave or S-wave arrivals may be used if desired. Movement of the current source location will be reflected by changes in the remaining five free cursors. The position of the anchor cursor does not change as the source location is varied. Hodogram crossplots of the windowed P-wave and S-wave data shown on the left side of the Cursor Display are used to adjust the source azimuth angle (step 108 in FIG. 3).

The current source location is shown both in the text and in graphical form, depicted in the x-z plane by a black square with lines to the tool image on the left border of the time series portion of the display. The source location may be varied in four directions (up, down, left, right). As the source location is varied in the Cursor Display, the P-wave cursors 200, 202, and 204 and the S-wave cursors 206, 208, and 210 and hodogram images (described below) will change to reflect changes in the acoustic traveltimes from the updated source location to each receiver.

Also shown in FIG. 5 are cursors 212 and 214 showing possible arrival times of near-wellbore events that might be traveling at the velocity of seismic waves in water (about 4800 ft/sec) or in steel (about 17,000 ft/sec). The Cursor Display allows for screening of such events.

The azimuth angle to the source location may not be well determined when entering the Cursor Display. It may be possible to update the azimuth from this display using the two hodograms along the lower left side of the display. These are small versions of the Horizontal Hodogram Display (FIG. 7) discussed below. The hodogram crossplots are updated for a time window about each of the P-wave and S-wave cursor locations corresponding to the time shifts applied in the Alignment Display (FIG. 6) discussed below.

From the Cursor Display, time difference fixes may be selected as described in more detail below. This task is essentially one of recognizing that, at the current source location, one of the fifteen P—P, S—S, or P–S time differences are approximately matched and ready to be "fixed."

In the next step of the method (step 110 in FIG. 3), the solution is refined. This comprises iteratively refining the window selection and rotating the azimuth angle (step 112) and adjusting the source location to maximize alignment of P—P, S—S, and P–S waveforms and fix time differences (step 114). Two displays, an "Alignment Display" (FIG. 6) and a "Horizontal Hodogram Display" (FIG. 7) are used to refine the solution.

The Alignment Display (FIG. 6) is used to refine the solution by seeking the maximum degree of alignment of the time-shifted waveforms. By applying the appropriate time shifts to remove the calculated time differences, the waveforms may be more closely matched by aligning the early portions of each P-wave and S-wave arrival component.

To prepare for the Alignment Display, the horizontal component data are transformed from easterly and northerly components to respective components along perpendicular P and S axes. The P-axis is oriented along the current azimuth to the source, and the S-axis is oriented perpendicular to the direction to the source. The P and S axes thus form a right-handed coordinate system obtained by coordinate rotation through the azimuth angle, and the sensor response in easterly and northerly components may be represented in the P and S coordinate system. P-wave energy should be represented primarily by the response along the P-axis, and S-wave energy should be mostly captured along the S-axis. Due to mode conversions and leakage, some P-wave energy is usually found on the S-axis, and vice versa.

In the Alignment Display, the P-axis data are plotted with inverse time shifts using the P-wave traveltimes from the current source location to each receiver. The S-axis data are plotted using the respective inverse S-wave time shifts. These time shift values are obtained from an internal array of traveltimes between each grid point in the x-z plane and each of the receivers, for both P and S components. Traveltimes may be calculated by one of several methods known by those skilled in the art. Alternatively, the traveltime differences between each value and the minimum traveltime of the set corresponding to those at a particular grid point may be used to inverse time shift the data. This relative time shift implementation is preferred because it uses computer resources more efficiently.

In the following discussion, the notations $P_i$ and $P_j$ correspond to the P-axis data after inverse time shifting by amounts determined by the P-wave traveltimes between the current source location and the $i^{th}$ receiver and $j^{th}$ receiver, respectively. Similarly, the notations $S_i$ and $S_j$ correspond to the S-axis data after inverse time shifting by an amount determined by the S-wave traveltimes between the current source location and the $i^{th}$ receiver and $j^{th}$ receiver, respectively. Because the S-wave is generally slower than the P-wave, the S-wave inverse time shift usually is greater than that for the P-wave, resulting in a relative shift in the S-wave energy to the left in the Alignment Display.

The time series data shown on the right side of the Alignment Display is divided into five sections consisting of the following crossplots proceeding from top to bottom: $P_i$–$P_j$, $S_i$–$S_j$, $P_1$–$S_j$, $P_2$–$S_j$, and $P_3$–$S_j$. Movement of the current source location causes the waveforms to be shifted as the time shifts are updated for the new source location. This facilitates relocation of the source until a desired alignment is obtained.

The optimal source location will be that which achieves the greatest degree of alignment of the initial energy on each waveform in the Alignment Display. The arrival time differences may be fixed from this display for purposes of interpreting the most likely source location in the "Solution Display" (FIG. 8), discussed below. The process of "fixing" a time difference consists of visually selecting an arrival time difference (typically using peak-to-peak time differences, but optionally inception-to-inception time differences), recognizing that an alignment has been achieved, and selecting a waveform arrival time difference match to be saved. Once a time difference has been fixed, a loci of points corresponding to that time difference will be plotted on a "Solution Display" (see FIG. 8), as further described below.

Because the data in the Alignment Display are prepared as the respective component values along the directions parallel and perpendicular to the source location, revisions to the azimuth estimate will cause changes in the P and S data series shown in the Alignment Display. The small hodograms on the lower left side correspond to the data windows on the right side. The upper P hodogram is the data corresponding to the P-wave time shifts of the top section on the right, and the lower S hodogram is the data window of the S-wave time shifts of the next section. In the example of FIG. 6, the orthogonal rotation of the energy from the first P-wave data to the later S-wave data is evident. This display may be used to refine the azimuth angle, or alternatively the larger version in the Horizontal Hodogram Display (FIG. 7) may be used.

FIG. 7 is a "Horizontal Hodogram Display" that may be used to determine the azimuth angle to the source. The graph on the left side consists of the horizontal signals plotted as northerly versus easterly components with P-wave inverse time shifts that correspond to the top section of the Alignment Display (FIG. 6). Similarly, the right side shows the horizontal components with inverse time shifts for the S-wave traveltimes. These windows thus consist of the horizontal response, inverse time shifted for the respective waveform type (P or S). By using the time-shifted components, simultaneous matching of azimuths at all receivers is facilitated, and also both the P-wave and S-wave arrivals may be simultaneously fit as suitable for the respective directions of the arrivals.

In FIG. 7, additional statistics are available to indicate the results of numerical regression on the data within the window, relative to the objectives of fitting an ellipse in the direction of the source (P-wave) or orthogonal to that direction (S-wave). In the example shown in FIG. 7, for an azimuth to the source of 123°, the P-wave data should be so oriented and the S-wave data should be oriented along the 33° direction, as indicated at the top of the text blocks above each hodogram. The individual regression results for the data for each receiver are shown, with P-wave time window regression results of 127° ($R^2$=0.94) for receiver R1, 133° ($R^2$=0.98) for receiver R2, and 111° ($R^2$=0.99) for receiver R3. The regression results and $R^2$ values are determined using a special regression procedure developed for hodogram analysis. This method is superior to standard linear regression in Cartesian coordinates when the problem is most naturally presented in polar coordinates. For all possible azimuth angles $\alpha$ from 0° to 179°, the following calculation is performed for the data within the specified time window from index p to q:

$$R^2 = \frac{\sum_{i=p}^{q} u_i^2}{\sum_{i=p}^{q} u_i^2 + v_i^2}$$

for
  $u_i = n_i \cos\alpha + e_i \sin\alpha$
  $v_i = n_i \sin\alpha - e_i \cos\alpha$ The variable $u_i$ corresponds to the projection of the horizontal sensor response along the azimuth angle $\alpha$, and the variable $v_i$ is the projection orthogonal to that direction. The $n_i$ and $e_i$ variables correspond, respectively, to the northerly and easterly components of the horizontal sensor response. The value of $\alpha$ that maximizes $R^2$ is the solution to the regression, since the $R^2$ statistic measures the sum of squares along the azimuth direction relative to the total sum of squares. This value is maximized for the most likely azimuth direction.

In a similar manner to that for the P-wave hodogram, a regression analysis may be carried out for the ellipse of the horizontal response corresponding to the data after inverse time shifting for the S-wave arrival. Since it is not assured that the P-wave has decayed by the time of the arrival of the S-wave, there may or may not be a good regression fit obtained over the S-wave hodogram shown on the right side of FIG. 7. Field test data have shown reasonably good results for the S-wave hodogram, in part because the S-wave amplitude is usually larger than that of the P-wave.

FIG. 8 is the "Solution Display." The right side of the display consists of an image of the x-z half-plane, oriented along the azimuth angle to the source and passing through the wellbore axis. The wellbore lies along the left edge of this plane, and a tool image is also shown on this axis. The lateral distance x and depth z of the current source location are plotted in the plane, with lines to the top and bottom tool receivers as may also be found in FIGS. 5 and 6.

The solution may be developed by building up a series of arrival time alignments, "taking a fix" as in the terminology of marine navigation, and plotting the corresponding loci of points for each such fix. The grand intersection of these loci will determine the most likely source location for the event.

In the art of maritime navigation, the position of a ship may be determined by measuring the compass bearing of two or more buoys or shore objects and plotting lines on a chart through such objects at the measured angles. The intersection of the lines defines the ship location. In an even closer analogy, the location of a ship by the Loran method consists of determining two or more loci of points on the chart that correspond to measured time differences on different radio frequencies. The ship location is at the intersection of these loci. A similar approach is used in this microseismic data analysis, wherein 15 arrival time differences may be used to determine up to 15 loci of points.

Initially there are no loci shown in FIG. 8 for an event. Arrival time differences may be fixed from the Cursor Display (FIG. 5) and the Alignment Display (FIG. 6). As these time differences are determined, returning to the Solution Display (FIG. 8) will show progressively more loci corresponding to those that have been set. Lines emanating from the wellbore will be plotted for constant P—P or S—S time differences, and circular loci will be shown for constant P–S time differences (step 116 in FIG. 3). When the user has set a sufficient number of time differences such that there is a distinct intersection as shown in FIG. 8, the event location may be considered to have been determined in the x-z plane.

In this display, color coding is preferably used to show the number of loci intersections at each grid point. To obtain a location estimate with high accuracy, it is important to achieve a sufficient mixture of loci intersection. Although only two P—P or S—S intersections are required to determine a source location, the range estimate will not be very precise unless the event is relatively near the wellbore. One or more P–S intersections is useful to develop a circular loci that intersects these linear loci with more precision. Analogously, the location estimate from two P–S loci will be significantly improved by intersection with one or more P—P or S—S loci.

On the left side of the Solution Display are two hodogram images, one for the P-wave window and one for the S-wave window. These are small versions of those shown in the Horizontal Hodogram Display (FIG. 7) and are available to confirm proper azimuthal orientation.

Figure 9:
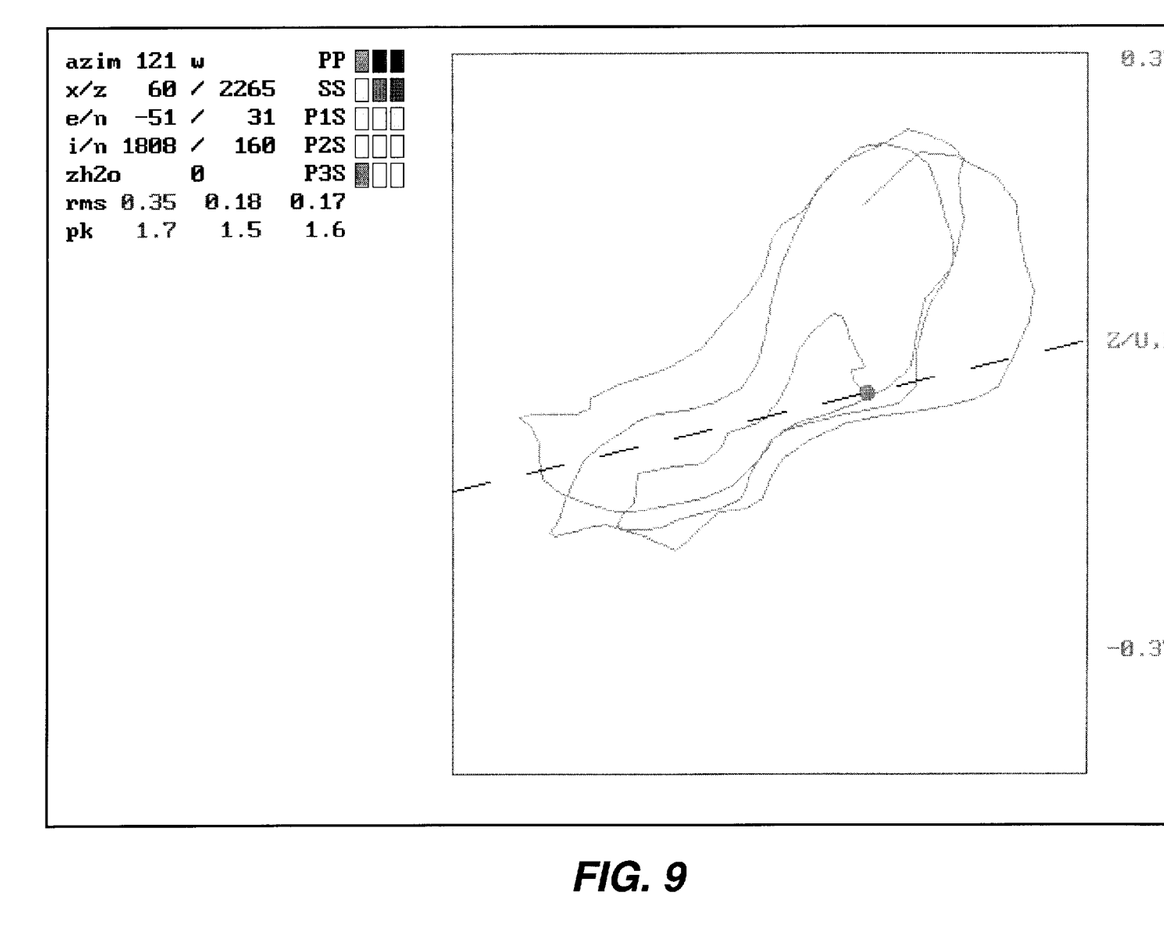

Finally, FIG. 9 is a "Vertical Hodogram Display." In this display, the horizontal x component along the azimuthal direction is the abscissa, and the vertical z response is the ordinate. The P-wave traveltimes have been used for inverse time shifting so that the window selection corresponds to the top section of the Alignment Display (FIG. 6).

A line representing the inclination angle from the receiver to the current source location is also shown in this display. This line will be oriented "up" or "down" depending on which side of the wellbore the event is located. The most likely orientation is obtained by achieving the best fit between this inclination line and the hodogram of the data in the x-z plane.

The source location may be varied between the west and east sides of the wellbore, resulting in a flip-flop of the inclination line from the receiver to the current source location. The window frame may also be modified from this display until the event location ambiguity is resolved (step 118 in FIG. 3), for the calculations in the other displays allow for two possible source locations on opposite sides of the well. Note that in the current tool configuration, the z channel from only the top receiver is recorded. With additional z channels, further confirmation of source location would be established.

Although the flowchart in FIG. 3 indicates an anticipated order for the various operations, it will be understood that the software tool should be designed to facilitate iterating between different displays to obtain the most effective source location solution.

The procedure for estimating the location of a microseismic event source has been described heretofore. The apparatus and method of this invention are also applicable to a continuous acoustic wave from a source which is to be located. In such cases, a data window is selected, consisting of a selected number of time samples. The same procedure is then followed as set out above.

When the apparatus or method of this invention is applied to detection of the extent of a hydraulic fracture, the apparatus may be placed at a single location in a wellbore from which the fracture extends or it may be placed at multiple locations and microseismic events detected from each location. The apparatus may be placed in the well from which the fracture extends or it may be placed in an offset well.

If there is particular interest in determining if a hydraulic fracture has been extended out of the zone of fluid injection in an injection well, the apparatus may be placed at one or multiple locations near a possible barrier to fluid flow, and may be used to determine if microseismic events occur on the side of the barrier opposite the injection zone, using the techniques described above.

It has been observed that signals from microseismic events can be received through multiple strings of pipe in a well. For example, in a well having 5½-inch casing suspended in 13⅜-inch casing and extending only partially to the bottom, signal strength from explosion of a small test charge was only slightly attenuated when the apparatus was clamped inside the 5½-inch casing rather than in the 13⅜-inch casing. Therefore, the apparatus of this invention may be placed inside multiple concentric pipes and the method described above may be used to determine the source of microseismic events.

It will be appreciated that while the present invention has been primarily described with regard to the foregoing embodiments, it should be understood that variations and modifications may be made in the embodiments described herein without departing from the broad inventive concept disclosed above or claimed hereafter.

I claim:

1. Apparatus for locating a source of acoustic waves in the earth, said apparatus comprising:
    an elongated body having a longitudinal axis and a plurality of segments and being adapted to be connected to a wireline to allow placing said apparatus in a well;
    a plurality of acoustic receivers comprising separate segments of said elongated body and being attached to said elongated body in a manner that prevents significant torsional deformation of each acoustic receiver with respect to each other acoustic receiver, each of said acoustic receivers including retractable means for exerting a force for clamping said acoustic receiver in said well and having two orthogonal acoustic sensors lying in a plane substantially perpendicular to said longitudinal axis of said elongated body, each of said acoustic sensors adapted to produce an electrical signal in response to an acoustic wave impinging thereon; and
    electronic means disposed in at least one segment of said elongated body, said electronic means being capable of substantially continuously transmitting said electrical signals to the surface of the earth in real-time.

2. The apparatus of claim 1, wherein said wireline includes one or more fiber optic strands, and wherein said electronic means includes a digitizing circuit to convert said electrical signals to digital signals and a transceiver to convert said digital signals to light pulses for transmission to the surface of the earth over said fiber optic strands.

3. The apparatus of claim 1, wherein said wireline includes one or more copper strands, and wherein said electronic means includes a digitizing circuit to convert said electrical signals to digital signals and a modem to transmit said digital signals to the surface of the earth over said copper strands.

4. The apparatus of claim 1, wherein said apparatus includes at least three acoustic receivers, and wherein at least one of said acoustic receivers includes a third acoustic sensor orthogonal to said two other acoustic sensors.

5. A method for determining the location of a source of acoustic waves in the earth, said method comprising the steps of:
    placing an apparatus in a well on a wireline, said apparatus including (a) at least two spaced-apart acoustic receivers, each of said acoustic receivers including retractable means for exerting a force for clamping said acoustic receiver in said well and having two orthogonal acoustic sensors lying in a plane substantially perpendicular to the axis of said well, each of said acoustic sensors adapted to produce an electrical signal in response to an acoustic wave impinging thereon, and (b) electronic means for transmitting said electrical signals to the surface of the earth in real-time;
    clamping said acoustic receivers in said well;
    using said acoustic sensors to detect said acoustic waves and produce electrical signals in response thereto;
    transmitting said electrical signals to the surface of the earth; and
    using said electrical signals at the surface of the earth to calculate the location of said source of acoustic waves.

6. The method of claim 5, wherein said apparatus has a longitudinal axis extending through said spaced-apart acoustic receivers, and wherein said acoustic waves include both P-waves and S-waves, and wherein said step of using said electrical signals to calculate the location of said source of acoustic waves further comprises the steps of:
    using hodogram analysis methods for both said P-waves and S-waves to determine the azimuth angle from said apparatus to said source of acoustic waves;
    using said azimuth angle to define a plane that contains said longitudinal axis of said apparatus and said source of acoustic waves;
    determining actual time differences between initial arrivals of both said P-waves and said S-waves at said acoustic receivers;

estimating traveltime differences for both said P-waves and said S-waves from a plurality of possible source locations within said plane to said acoustic receivers; and selecting as the location of said source of acoustic waves the possible source location for which said estimated traveltime differences most closely approximate said actual time differences.

7. The method of claim 5, wherein said apparatus has a longitudinal axis extending through said spaced-apart acoustic receivers, and wherein said acoustic waves include both P-waves and S-waves, and wherein said step of using said electrical signals to calculate the location of said source of acoustic waves further comprises the steps of:

using hodogram analysis methods for both said P-waves and said S-waves to determine the azimuth angle from said apparatus to said source of acoustic waves;

using said azimuth angle to define a plane that contains said longitudinal axis of said apparatus and said source of acoustic waves;

shifting arrival times of said P-waves and said S-waves at said receivers based on calculated traveltimes from possible source locations in said plane to said acoustic receivers; and selecting as the location of said source of acoustic waves the possible source location that substantially maximizes alignment of said time-shifted P-waves and S-waves.

8. The method of claim 5, wherein at least one of said acoustic receivers includes a third acoustic sensor orthogonal to said two other acoustic sensors, data from said third acoustic sensor being used to resolve ambiguities in the location of said source of acoustic waves.

* * * * *